Feb. 25, 1947.  W. P. MASON  2,416,337
VIBRATION DAMPING CIRCUIT
Filed June 10, 1943   3 Sheets-Sheet 1
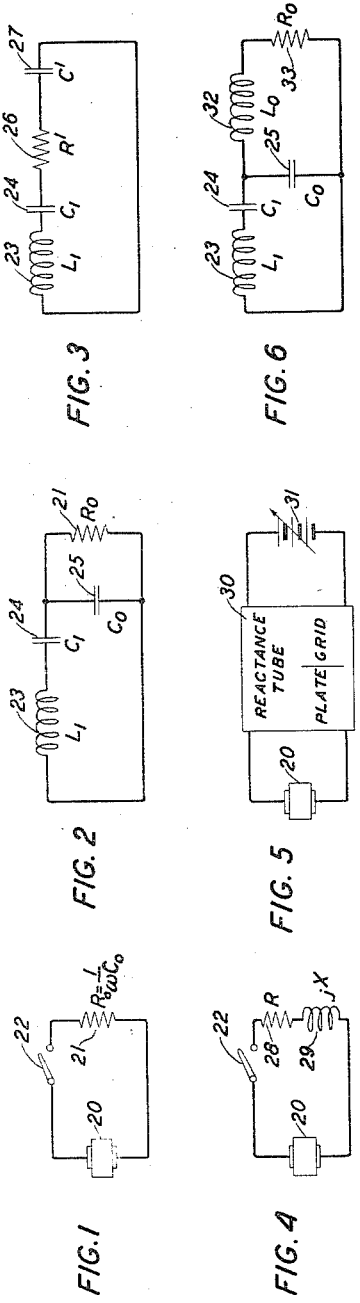
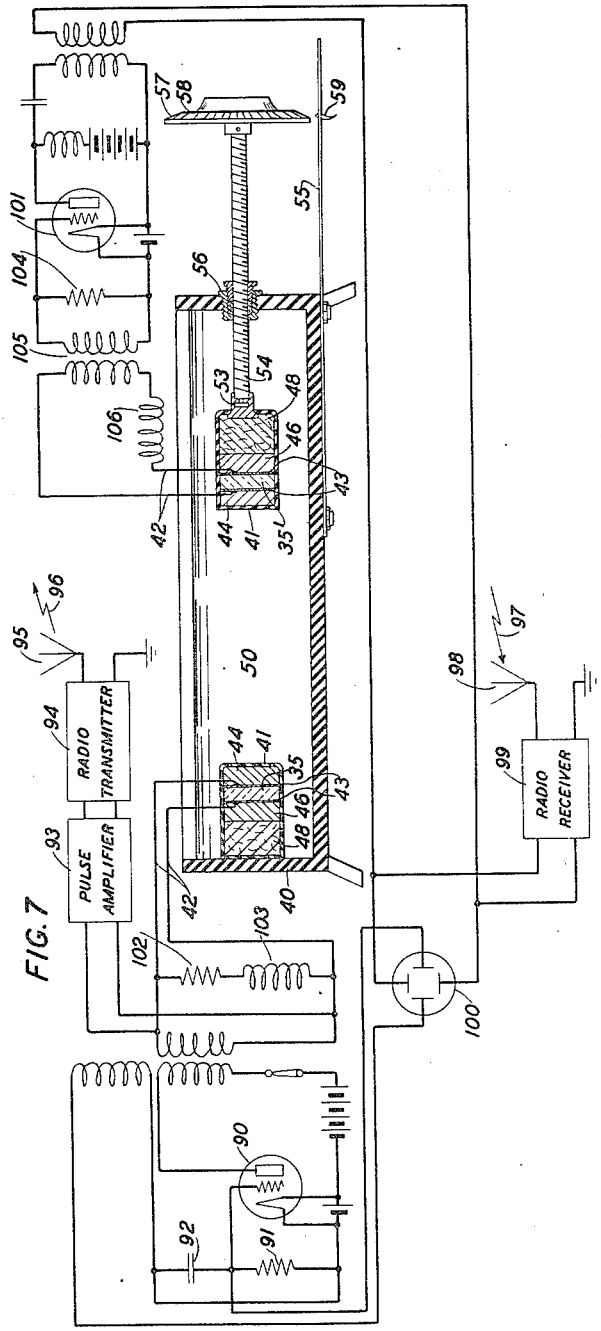
INVENTOR
*W. P. MASON*
BY
*Franklin Mohr*
ATTORNEY Feb. 25, 1947.   W. P. MASON   2,416,337
VIBRATION DAMPING CIRCUIT
Filed June 10, 1943   3 Sheets-Sheet 2

INVENTOR
W. P. MASON
BY Franklin Mohr
ATTORNEY

INVENTOR
W. P. MASON
BY
Franklin Mohr
ATTORNEY

Patented Feb. 25, 1947

2,416,337

UNITED STATES PATENT OFFICE 2,416,337

VIBRATION DAMPING CIRCUIT

Warren P. Mason, West Orange, N. J., assignor to Bell Telephone Laboratories, Incorporated, New York, N. Y., a corporation of New York Application June 10, 1943, Serial No. 490,278

7 Claims. (Cl. 178—44)

This invention relates to piezoelectric vibratory elements and more particularly to arrangements for damping the vibrations of such elements.

An object of the invention is to permit efficient shock excitation of a piezoelectric vibrator followed by rapid damping of the vibrations. Such procedure will be recognized as producing a short and very sharp pulse of vibratory energy characterized by rapid starting and abrupt stopping of the vibrations.

In a copending application of the present applicant as joint inventor with W. L. Bond, Serial No. 407,456, filed August 19, 1941, and assigned to the assignee of the present application, there is disclosed means for increasing the damping of a piezoelectric crystal by adding mechanical damping to the natural damping of the crystal. The present applicant has discovered that the damping of the crystal can be still further augmented by using electrical damping in combination with the mechanical damping disclosed in the above-cited joint application whereby the electrical damping is superposed upon the mechanical damping to produce a material increase over the effect of either alone.

While the invention is applicable to piezoelectric vibrators in any organization wherein rapid damping is desired, it is particularly useful in connection with a time measuring system employing a liquid type delay device.

In the drawings,

Figs. 1, 2 and 3 are simplified schematic representations useful in explaining one embodiment of the invention;

Figs. 4, 5 and 6 are simplified schematic representations useful in explaining a second embodiment of the invention;

Fig. 7 is a schematic representation of a time measuring or distance measuring system embodying the invention;

Figure 8:
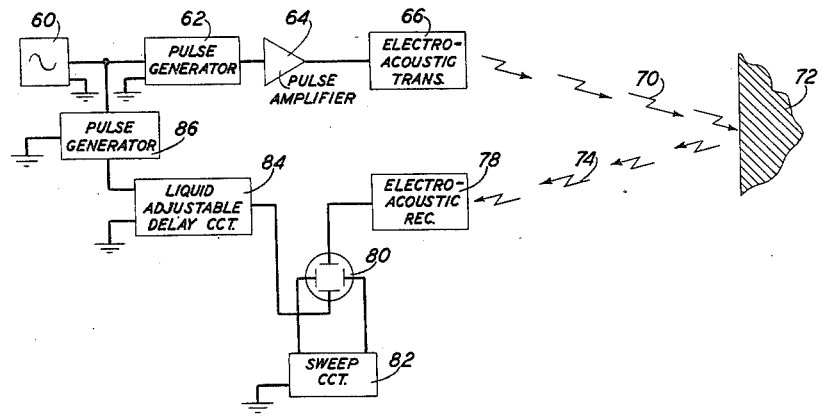
Fig. 8 is a simplified schematic representation of a system generically like that shown in Fig. 7.

According to the invention, electrical damping may be applied to a piezoelectric crystal by means of a pure resistance load or by a combined load consisting of a resistance and a positive reactance. It is desirable that the load be connected as suddenly as possible at the instant when it is desired that the damping should start.

Fig. 1 illustrates schematically the case of pure resistance damping. A piezoelectric crystal 20 may have connected across it a resistor 21 or any suitable resistive load. Sudden application of the load may be effected in any known manner as, for example, by means of a switch 22. It will be shown hereinafter that the optimum value of the resistor 21 for the most rapid damping will be $$R_0 = \frac{1}{\omega C_0}$$

where $\omega$ is $2\pi$ times the operating frequency of the crystal and $C_0$ is the apparent shunt capacity of the crystal as shown in Fig. 2.

Fig. 2 shows the usual equivalent electrical representation of a piezoelectric crystal as having equivalent series inductance $L_1$ and series capacitance $C_1$ together with shunt capacitance $C_0$ represented respectively by a coil 23 and condensers 24 and 25. The figure shows the damping resistance 21 connected in circuit in a manner corresponding to the closed condition of the switch 22 in Fig. 1. For purposes of calculation the circuit of Fig. 2 is readily converted at any single frequency, for example the operating frequency of the crystal, into an equivalent series circuit as shown in Fig. 3 where a resistance 26 and a capacitance 27 in series represent the parallel combination of the resistance 21 and capacity 25 of Fig. 2.

Fig. 4 illustrates electrical damping employing a positive reactance and a resistance in series. This arrangement will be shown to provide a considerably greater degree of damping than can be obtained with the circuit of Fig. 1. The damping elements may comprise a resistor 28 and a coil 29 as shown in Fig. 4, or, if desired, a vacuum tube arrangement commonly referred to as a reactance tube, may be employed as shown in Fig. 5. The reactance tube is schematically represented at 30, the plate circuit of the tube being connected across the terminals of the crystal 20 and the impedance of the plate circuit being controlled by a variable potential source 31 in the grid circuit.

Fig. 6 represents the equivalent circuit of either the arrangement of Fig. 4 or that of Fig. 5. The positive reactance is shown as a coil 32 in series with a resistor 33. The reactance elements 23, 24, 25 and 32 will be seen to form an unsymmetrical T-network which may be regarded as a section of a filter. The values of the inductance 32 and the resistance 33 may be selected in such a way as to combine with the crystal to form a band-pass filter with a desired frequency characteristic and suitable terminal damping. It will be shown hereinafter that the optimum condition for rapid damping of the crystal will obtain when the filter has the broadest possible transmission band and is terminated in its characteristic impedance. It is found that the band width of the filter is determined by the ratio of the capacities $C_0$ and $C_1$. The value of this ratio in any specific application is determined by the choice of piezoelectric crystal.

Fig. 7 shows an embodiment of the invention in a system for measuring distances by means of the time required by an electromagnetic wave to traverse the distance to be measured. In the usual system of this kind, the electromagnetic wave is reflected from a distant object and returns to the transmitting station, at which place the distance measurement is made by observing the time of travel of the wave to the object and return. Two piezoelectric crystals 35 and 35' are shown, one at the left end and the other at the right end of a tank 40 containing a liquid 50 therein. The crystals can be of any of the well-known piezoelectric materials, such as quartz, Rochelle salt or tourmaline. Conducting leads 42 and electrodes 43 provide means for making appropriate electrical coupling with the crystals.

On the more central face of each crystal a layer of material, member 44, is positioned. Member 44 can be, as explained in the above-cited joint application of Bond and Mason, an acoustic impedance transforming device to match the impedance of the crystal with that of the liquid and it can further introduce energy absorption or damping of the crystal, if desired, as will be discussed hereinafter. If impedance transformation alone is desired, the thickness of member 44 is preferably made one-quarter wave-length (or a low odd number of one-quarter wavelengths) of the frequency being transmitted through the liquid, or of the mid-frequency (or predominant frequency) if a group of frequencies is being transmitted. If Rochelle salt crystals are employed, member 44 may be a simple plastic, for example, methyl methacrylate, since a small impedance transformation will suffice. The impedance transforming properties of several plastic materials and a table of values of the acoustic or compressional wave impedances of the materials are supplied in the above-cited joint application of Bond and Mason. If the crystals employed are quartz, however, a larger transformation will be necessary and, as was explained in the joint application, member 44 can then comprise a plastic in which metal particles are suspended, for example, phenol formaldehyde with 30 per cent of powdered permalloy (85 per cent Ni) to match quartz and water. Alternatively, member 44 may be a laminated member, alternate laminations being of plastic and of metal, respectively.

On the side of the crystal opposite member 44 in each case a member 46 is positioned, with a second member 48 adjacent the member 46 as shown in the figure. Member 46 is similar to member 44 but its function is to match the compressional wave impedance of the crystal to that of the member 48 rather than to that of the liquid. One of the possible constructions suggested for member 44 can obviously be selected for member 46 depending upon the particular impedance matching problem presented. Member 48 is an absorber of compressional wave energy, for example, felt, the function of which is to absorb energy and thus prevent its reflection back to its associated crystal or to the crystal at the other end of the tank. Reflections or echoes are generally objectionable in communication or measuring circuits, except where expressly utilized as in the case of a reflection from a distant object, as reflections or echoes usually tend to distort or obscure the desired signals or to provide misleading signals, and the substantial elimination at the unused sides of the crystals of reflections is highly desirable for many purposes.

In cases where it is desirable to exclude the liquid from direct contact with the crystal and associated impedance corrective and energy absorbing members, for example when Rochelle salt crystals soluble in water are used, a thin membrane of rubber or similar material can be employed to form a liquid-tight envelope 41 without appreciably damping or otherwise adversely affecting the action of the assembly. The effect of such a membrane from the standpoint of impedance, if appreciable, can be taken into account in the over-all design of the assembly.

Where the time of travel of a compressional wave, generated by one crystal in response to electrical stimulation, through the liquid 50 to the other crystal, is employed in timing some phenomenon, for example, the time interval required for an energy pulse to travel to a distant surface and return to its point of origin, it is convenient to be able to adjust the distance between the crystals in tank 40. For this purpose, one crystal can be supported through a rotatable collar 53 on a rod 54 extending through a threaded bushing 56 in the side of tank 40. Rod 54 is threaded for the greater part of its length so that by turning a knob 58, the longitudinal position of the crystal supported on rod 54 may be adjusted over an appropriate range. Knob 58 carries a suitable scale 57 and a slidable index pointer 59 carried on a fixed rod 55 is provided to facilitate use of the scale 57. A micrometer arrangement of any of the types well known to the art may be employed to afford precise adjustment, if desired.

The general scheme of a pulse-reflection type of distance measuring system as disclosed in Fig. 7 may be conveniently described with reference to Fig. 8 in which the main constituent parts of a similar system are indicated in block diagram form. In Fig. 8 an oscillator 60 furnishes a sine wave to a pair of pulse generators 62 and 86 which generate one pulse for each cycle of the sine wave. A pulse amplifier 64 amplifies the pulses furnished by the generator 62 and actuates an electroacoustic transmitter 66, to send out a series of acoustic pulses 70 having the periodicity determined by the oscillator 60. Obviously, this periodicity should be such that reflected pulses from a surface at the greatest distance to be measured will arrive back at the acoustic receiver before the next succeeding pulse is emitted by the transmitter 66. Reflections 74 of the pulses 70 from a distant surface 72 are received in the acoustic receiver, indicated as an electroacoustic device 78, converted into electrical pulses and applied to a vertical deflecting plate of a cathode ray oscilloscope 80. The horizontal deflecting plates of the oscilloscope are connected to a sweep circuit 82 which furnishes, preferably, a sawtooth wave deflecting voltage which deflects the ray of the oscilloscope across the target in synchronism with the emission of pulses by the transmitter 66. The pulse generator 86 furnishes other pulses to a liquid, adjustable, delay circuit 84, which pulses are in synchronism with the pulses of the generator 62. The delay circuit output is supplied to the other vertical deflecting plate of the oscilloscope 80 and the delay circuit is adjusted until the pulses furnished by it are in synchronism with the pulses furnished by the receiver 78. The adjustment of the circuit 84 required to produce this synchronism is then a measure of the time of travel and therefore the distance traveled by the pulses to the reflecting surface 72 and back and the dial of the delay circuit can therefore be calibrated to read the distance directly.

Obviously, a radio transmitter and antenna and a radio receiver and antenna could be substituted for the corresponding acoustic transmitter and receiver, respectively, of Fig. 8, in which case the dial of the adjustable delay circuit should be calibrated in terms of the time of travel of electromagnetic waves rather than acoustic waves. The system of Fig. 7, in fact, is shown as being of the type in which electromagnetic waves, rather than acoustic waves, are employed.

In the arrangement of Fig. 7, the functions of the sine wave generator 60 and the pulse generators 62 and 86 of Fig. 8 are performed by an oscillator of intermittent operation comprising a vacuum tube device 90 and a resistance-capacity frequency-determining circuit including a resistor 91 and a condenser 92. A pulse amplifier 93 corresponding to the pulse amplifier 64 of Fig. 8 is employed to transmit amplified pulses from the tube 90 to a radio transmitter 94 which actuates a transmitting antenna 95. Electromagnetic pulses as indicated at 96 are sent from the antenna 95 and returning pulses indicated at 97 are received from a distant object or surface and intercepted by a receiving antenna 98 connected to a radio receiver 99. Pulses from the tube 90 are also impressed upon the piezoelectric crystal 35 at the left end of the tank 40 to shock excite the crystal and produce compressional or acoustic waves in the liquid 50. A similar piezoelectric crystal 35' at the right end of the tank 40 receives the compressional waves after a definite delay period consumed in travel through the liquid and impresses an electrical pulse upon the electrodes 43 and the connecting leads 42.

Reflected pulses received by the radio receiver 99 are impressed upon the vertical deflecting plates of the cathode ray oscilloscope 100 together with pulses supplied by the crystal 35' through the leads 42 and a pulse amplifier 101. The horizontal deflecting plates of the oscilloscope 100 are connected to the condenser 92 across which there is developed a saw-tooth wave which serves as a sweep voltage.

The electrical damping for the crystal 35, in accordance with the present invention, is provided by means of a resistor 102 and a positive reactance or inductance coil 103. For the crystal 35', the damping resistance is supplied by the grid circuit of the pulse amplifier 101, comprising principally a shunt resistor 104, modified in magnitude as desired to secure an impedance match, by means of a transformer 105. The damping inductance is supplied by means of a coil 106. The resistor 102 and inductance 103 correspond respectively to the resistance 33 and inductance 32 of Fig. 6. Likewise, the resistance as viewed through the primary winding of the transformer 105 corresponds to the resistance 33 of Fig. 6 and the coil 106 corresponds to the coil 32.

The operation of the system of Fig. 7 as a whole is similar to that of Fig. 8. The generating tube 90 produces a series of pulses which are supplied both to the radio transmitter and to the liquid delay circuit. The pulses for the radio transmitter are amplified by the pulse amplifier 93 and are transmitted by the antenna 95. The pulses supplied to the delay circuit build up oscillations in the crystal 35 in well-known manner during the brief interval of each pulse. Between pulses, the tube 90 represents an open circuit which removes the low impedance shunting effect of the discharge of the tube 90 from the shunt circuit 102, 103, thereby effectively connecting the damping resistance and damping inductance directly across the electrodes 43 of the crystal 35. Thus, immediately upon the termination of the pulse from the tube 90 the electrical damping is effective upon the crystal 35. The electrical damping operates in addition to the mechanical damping of the crystal, the latter damping being provided principally by the mechanical damping element 48. While the electromagnetic pulse 96 is travelling to the distant object and returning to the receiving antenna 98 as the pulse 97, an acoustical or compressional wave sent out by the crystal 35 is travelling through the liquid 50 to reach the crystal 35'. The compressional wave upon reaching the crystal 35' produces mechanical vibrations of the crystal, which in turn set up electrical oscillations in the circuit containing the electrodes 43, the transformer 105 and the inductance 106. At the cessation of the compressional pulse in the liquid, the vibrations of the crystal 35' are damped out mechanically by the adjacent element 48 and electrically by the members 105 and 106. The electrical pulse generated by the crystal is amplified in the tube 101 and impressed upon the vertical deflecting plates of the oscilloscope 100, as previously described.

The electromagnetic pulse 97 is also impressed upon the vertical deflecting plates of the oscilloscope. The horizontal deflecting plates of the oscilloscope cause the electron beam of the oscilloscope to traverse the screen from one side to the other once for each pulse. As viewed upon the screen of the oscilloscope, therefore, two vertical deflections may first appear, one due to the electromagnetic wave returned by the distant object and the other due to the pulse transmitted to the delay circuit. By operating the knob 58 the delay inserted by the delay circuit may be adjusted and the deflections in the oscilloscope brought into coincidence. When this adjustment has been made, the distance to the object may be read upon the scale 57 in conjunction with the pointer 59.

Figure 9:
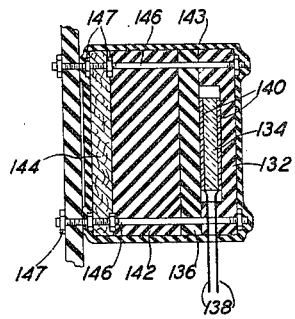
Fig. 9 is a cross-sectional view of a piezoelectric crystal provided with an impedance transforming mounting and means for mechanical damping of vibrations.

In Fig. 9, details of a particular form of crystal mounting are shown with mechanical damping only, as disclosed and claimed in the above-cited joint application of Bond and Mason.

A piezoelectric crystal 134, having electrodes 140 and conductive leads 138 to afford convenient electrical coupling thereto, is enclosed between members 136 and 132 which can be of plastic material, for example, methyl methacrylate, polystyrene, phenol formaldehyde, urea formaldehyde or the like, which may have suspended therein metallic particles in the event that it is desired to impart a modified compressional wave impedance to them. Member 132, in addition to forming part of the holder, can also act as a compressional wave impedance transformer and, if desired, can also contribute compressional wave energy absorption. Members 136 and 142 can likewise be made of plastics, or plastics with metal particles suspended therein, or alternately they can be of laminated construction with alternate laminae of plastic and metal, and member 144 is a compressional wave energy absorbing member, for example, felt, the function of which is to absorb the energy reaching it. The assembly may be held together by bolts 146 and nuts 147, which bolts may further serve to facilitate mounting the arrangement in operating position either in a tank such as 40 of Fig. 7 or on a vessel, buoy, or the like, for use in submarine signaling systems. The assembly is preferably sealed to be liquid-tight either by fusing the edges of the plastic members together by a hot iron where they come together or by enclosing the assembly in a thin membrane 143 of rubber or the like. If the member 144 is of felt or other liquid absorbing material it will, of course, be necessary to enclose it, at least, in some liquid-proof enclosure, if it is to be submerged.

Where radiation or absorption from both sides of the crystal 134 is desirable, members 142 and 144 can be omitted and the members 132 and 136 can function as impedance transformer or compressional wave damping means for the two sides of the crystal, respectively, in substantially identical manners.

Figure 10:
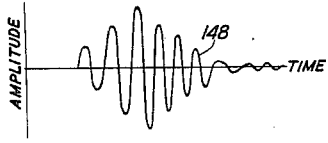
Figs. 10, 11 and 12 are graphic representations of pulses having different amounts of damping.
Figure 11:
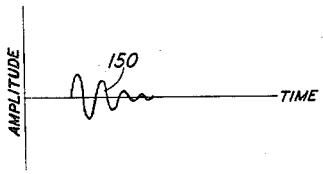
Figure 12:
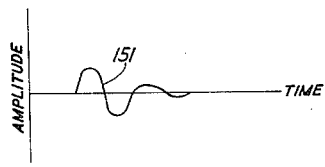

The effect of combined mechanical and electrical damping upon the oscillations of the piezoelectric crystal is illustrated graphically by means of Figs. 10, 11 and 12.

The curve 148 of Fig. 10 indicates the amplitude response with time of an undamped piezoelectric crystal of the types contemplated for use in arrangement of the invention. Obviously, reflected echoes of an energy pulse resulting from such response, arriving a half pulse length or so in advance of a succeeding directly transmitted pulse can entirely mask the initial vibrations of the latter pulse and cause a false indication in pulse timing arrangements of the invention. If mechanical damping alone is employed, for example by placing in contact with the crystal a material of relatively high compressional wave energy absorption (dissipation or resistance), its amplitude response can be changed to that represented by the curve 150 of Fig. 11 and combinations of echo pulses and directly transmitted pulses will be less likely to cause interference and false indications than in the case of the undamped crystal. The curve 151 of Fig. 12 illustrates, on a larger time scale, the effect of combining mechanical and electrical damping. It has been found theoretically and experimentally that the mechanical and electrical damping are cumulative in their effects to produce a substantial increase in the total damping as illustrated by a comparison of Figs. 11 and 12. The number of oscillations performed by the crystal may be reduced by about one-half by use of the combined damping compared with the use of either mechanical or electrical damping alone.

Figure 13:
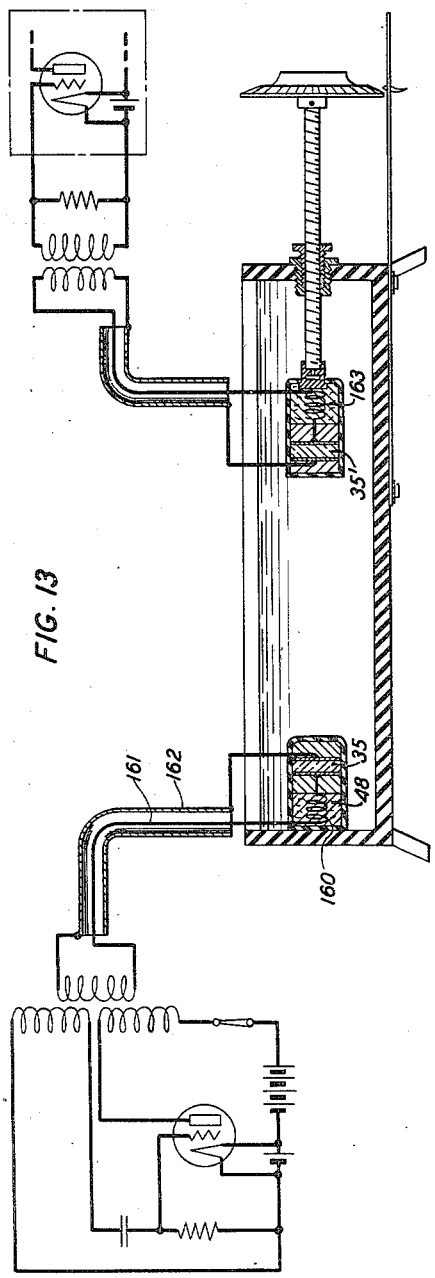
Fig. 13 shows an embodiment of the invention differing in some details from the arrangement of Fig. 7.

Fig. 13 shows a modification of a portion of a system like that shown in Fig. 7, including the pulse generator, the liquid delay circuit and a portion of the output system connected to the delay circuit. The feature of the modified system which embodies the present invention concerns only the electrical damping means for the crystals. The crystal 35 is shown connected to a damping coil 160 which may be embedded in the mechanical damping element 43. The damping resistance in this embodiment is supplied by the characteristic impedance, which is substantially a pure resistance, furnished by a coaxial feeder comprising an inner conductor 161 and an outer conductor or sheath 162. It is found in practice that a coaxial conductor system is readily designed by known methods to match the impedance of the piezoelectric crystal. The other crystal 35' is connected to a coil 163, likewise embedded in the mechanical damping element. The damping resistance may again be supplied by the impedance looking into a coaxial feeder connecting the crystal 35' with the pulse amplifier.

Figure 14:
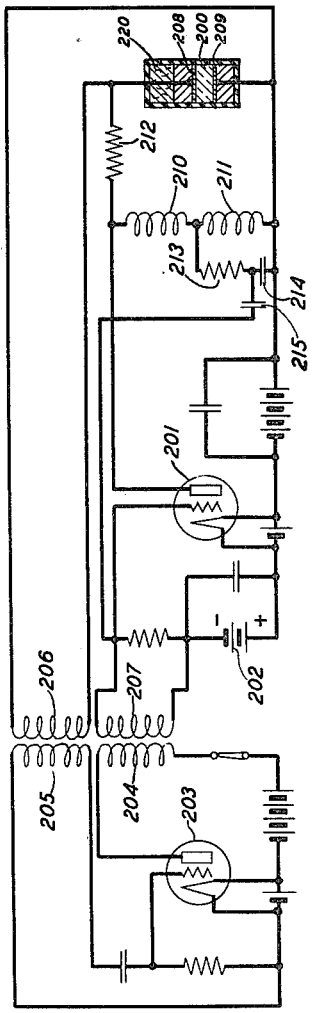
Fig. 14 is a schematic circuit diagram of a further embodiment of the invention.

Fig. 14 shows the application of electrical damping to a crystal by an arrangement wherein the damping inductance is supplied by means of a so-called reactance tube. A crystal 200 is connected in the plate circuit of a reactance tube 201, the grid circuit of which contains a control source of electromotive force represented by a battery 202, the negative terminal of which may be connected to the grid. The arrangement is schematically as shown in Fig. 5. A vacuum tube 203 is arranged to supply pulses for shock excitation of the crystal 200. A transformer comprising a primary winding 204 and secondary windings 205, 206 and 207 is used for interconnecting the tube 203 with the tube 201 and the crystal 200. The pulses generated by the tube 203 are transmitted through the primary 204 and the secondary 206 to accomplish the desired shock excitation of the crystal 200. At the end of each pulse, the crystal 200 is in mechanical vibration and has set up corresponding electrical vibrations in a circuit including terminals 208 and 209, attached to the crystal, and inductances 210 and 211. There may be included in the crystal circuit a damping resistor 212 and a mechanical damping element 220 may be mechanically coupled to the crystal. Electrical damping of the crystal 200 is accomplished by means of the resistor 212 together with a reactive effect produced by the tube 201. The tube 201 operates in the well-known manner of a reactance tube. A resistor 213 and a capacity 214 are connected in parallel across the coil 211 to produce across the condenser 214 a quadrature voltage which is fed back to the grid of the tube 201 through a series condenser 215. The quadrature voltage impressed upon the grid produces an amplified quadrature current in the plate circuit of the tube 201 which is the equivalent of placing an inductive reactance across the windings 210 and 211. This reactance is effectively in series with the resistance 212 across the crystal 200. The magnitude of the reactive current may be adjusted by proper selection or variation of the voltage of the source 202 in the grid circuit.

In any of the embodiments illustrated herein, where it is desired to employ the simple resistance damping as shown schematically in Fig. 1 in preference to the combination of resistance and inductance illustrated in Fig. 4, the inductance coils or other means for providing the inductive reactance may be omitted. The effectiveness of the simple resistance damping may be calculated by reference to Fig. 3. It is readily seen that the equivalent resistance $R'$ and the equivalent capacity $C'$ are given by the following formulae:

$$R' = \frac{\frac{R_0}{\omega^2 C_0^2}}{R_0^2 + \frac{1}{\omega^2 C_0^2}} = \frac{R_0}{1 + R_0^2 \omega^2 C_0^2} \quad (1)$$

$$C' = C_0 \left(1 + \frac{1}{\omega^2 C_0^2 R_0^2}\right)$$

A consideration of the formula for $R'$ shows that this quantity will have its maximum value when $R_0 = 1/\omega C_0$. For this case $$R' = \frac{R_0}{2} = \frac{1}{2\omega C_0} \quad (2)$$

The value of the reactance-resistance ratio $y$ of the resulting damped crystal will then be very closely equal to the reactance of $C_1$ (since this reactance is very large compared to the reactance of $C'$) divided by $R'$ or $$Q = \frac{\frac{1}{\omega C_1}}{\frac{1}{2\omega C_0}} = \frac{2C_0}{C_1} \quad (3)$$

or it equals twice the ratio of capacities of the crystal. About the lowest ratio of capacities that can be realized in a quartz crystal of low temperature coefficient is the ratio 125 for a 5-degree X cut crystal, which holds if the distributed capacity of the holder and wiring is kept low. Hence the lowest value of $Q$ to be expected by resistance damping alone is around 250, which in some applications may not be sufficiently low to provide the desired rapidity of damping.

By employing a positive reactance and a resistance in series, as illustrated in the above-described embodiments, a somewhat lower value of $Q$ and hence a greater degree of damping can be obtained. Referring to the equivalent filter section as shown in Fig. 6, the damping reactance and damping resistance may be brought in as filter elements, if they are given the following values:

$$L_0 = \frac{1}{4\pi^2 f_A f_B C_0} \quad (4)$$

$$R_0 = 2\pi(f_B - f_A)L_0$$

The band width of the filter is then such as is determined by the frequency ratio $$\frac{f_B}{f_A} = \sqrt{1 + \frac{1}{r}} + \sqrt{\frac{1}{r}} \quad (5)$$

where $f_B$ is the upper cut-off, $f_A$ the lower cut-off and $r$ the ratio of capacities $C_0/C_1$. When this filter is shock excited the oscillations die down to approximately one-third of the maximum amplitude in a time equal to $1/(f_B - f_A)$, or the reciprocal of the band width. For the crystal above-mentioned having a ratio of capacities of 125, it will be seen that $$\frac{f_B}{f_A} = \sqrt{1 + \frac{1}{125}} + \sqrt{\frac{1}{125}} = 1.0935 \quad (6)$$

Hence in terms of the mean frequency $$f_m = \sqrt{f_A f_B}$$

we have $$f_B = 1.046 f_m$$

$$f_A = \frac{f_m}{1.046} = .957 f_m \quad (7)$$

The time of dying down will then be $$t = \frac{1}{f_B - f_A} = \frac{1}{f_m(.089)} = \frac{11.2}{f_m} \quad (8)$$

since $tf_m = t/t_0$, where $t_0$ is the time of one cycle, the number of cycles to die down to ⅓ value is 11.2. To get the equivalent $Q$ value, we recollect that the decay of a tuned circuit is controlled by the factor $$e^{-\frac{Rt}{2L}} = e^{-\frac{R\omega_m t}{2\omega_m L}} = e^{-\frac{\pi f_m t}{Q}} = e^{-\frac{\pi(t/t_0)}{Q}} \quad (9)$$

Hence if $$\frac{\pi(t/t_0)}{Q} = 1 \quad (10)$$

the amplitude will have decayed down to $1/e$ or nearly ⅓. This requires a number of cycles given by $$(t/t_0) = Q/\pi \quad (11)$$

Comparing this with Equation 8 the effective $Q$ of the circuit of Fig. 6 is $$Q = \pi \times 11.2 = 35.2 \quad (12)$$

which is nearly ten times as effective as the resistance damping.

What is claimed is:

1. A vibration damping arrangement comprising a piezoelectric element the mechanical vibrations of which are to be damped, said piezoelectric element having a pair of electric terminals and representing the equivalent of a certain network of electric reactances, mechanical damping means mechanically coupled to said piezoelectric element to increase the natural damping thereof, electric means connected electrically to the said terminals of said piezoelectric element to build out the equivalent electric network to constitute a section of a band-pass filter, and electric resistance means connected to terminate the filter in substantially its characteristic impedance, whereby an electric damping is superposed upon the said mechanical damping, to produce a material increase in the total damping.

2. A vibration damping arrangement comprising a piezoelectric element the mechanical vibrations of which are to be damped, said piezoelectric element having a pair of electric terminals and representing the equivalent of a certain network of electric reactances, mechanical damping means mechanically coupled to said piezoelectric element to increase the natural damping thereof, a positive reactance element connected with said terminals to build out the equivalent electric network to constitute a section of a band-pass filter, and electric resistance means connected to terminate the filter in substantially its characteristic impedance, whereby an electric damping is superposed upon the said mechanical damping, to produce a material increase in the total damping.

3. A vibration damping arrangement comprising a piezoelectric element the mechanical vibrations of which are to be damped, said piezoelectric element having a pair of electric terminals and representing the equivalent of a certain network of electric reactances, mechanical damping means mechanically coupled to said piezoelectric element to increase the natural damping thereof, an inductance element connected with said terminals to build out the equivalent electric network to constitute a section of a band-pass filter, and electric resistance means connected to terminate the filter in substantially its characteristic impedance, whereby an electric damping is superposed upon the said mechanical damping, to produce a material increase in the total damping.

4. A piezoelectric vibrator combined with an electrical damping circuit shunting the electrodes of the vibrator, a switching device connected in parallel with said vibrator and said damping circuit, and a source of electromotive force for shock exciting said vibrator, said switching device intermittently connecting said source of electromotive force to said vibrator, said switching device presenting a negligible impedance during shock excitation whereby the said damping circuit is rendered ineffective during the excitation interval, and said switching device presenting a negligible shunting effect between excitation intervals whereby said damping circuit is made effective to damp said vibrator.

5. A piezoelectric vibrator combined with a mechanical damping element mechanically coupled thereto, and an inductance coil embedded in the material of said mechanical damping element, said inductance coil being electrically connected to said vibrator to augment the damping of said vibrator by electrical means.

6. A vibration damping arrangement comprising a piezoelectric element the mechanical vibrations of which are to be damped, said piezoelectric element having a pair of electric terminals and representing the equivalent of a certain network of electric reactances, mechanical damping means mechanically coupled to said piezoelectric element to increase the natural damping thereof, electric means connected electrically to the said terminals of said piezoelectric element to build out the equivalent electric network to constitute a section of a band-pass filter, and a coaxial transmission line having a characteristic impedance substantially matching that of said filter connected to terminate the filter, whereby an electric damping is superposed upon the said mechanical damping, to produce a material increase in the total damping.

7. A piezoelectric vibrator, an electric circuit connected electrically with said vibrator, means to develop an electromotive force in quadrature time phase relation with the current in said electric circuit, means to amplify said quadrature electromotive force and impress the amplified resultant upon said electric circuit to simulate a positive reactive element, and an electrical resistance element in series with said vibrator and said source of amplified quadrature electromotive force to effect electrical damping of said vibrator.

WARREN P. MASON.

REFERENCES CITED

The following references are of record in the file of this patent:

UNITED STATES PATENTS

| Number    | Name        | Date          |
|-----------|-------------|---------------|
| 2,133,333 | Proctor     | Oct. 18, 1938 |
| 2,126,886 | Hight       | Aug. 16, 1938 |
| 2,154,849 | Kamenarovic | Apr. 18, 1939 |
| 2,156,786 | Lamb        | May 2, 1939   |